Patented Aug. 15, 1950

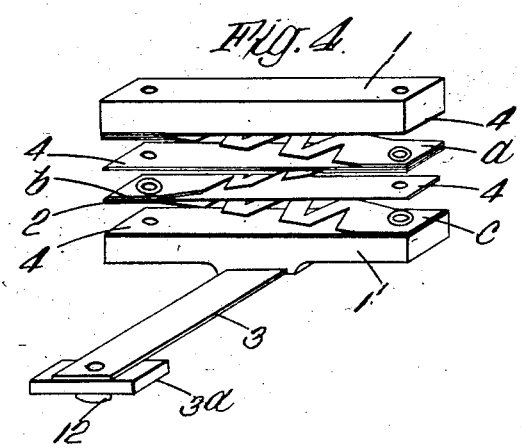
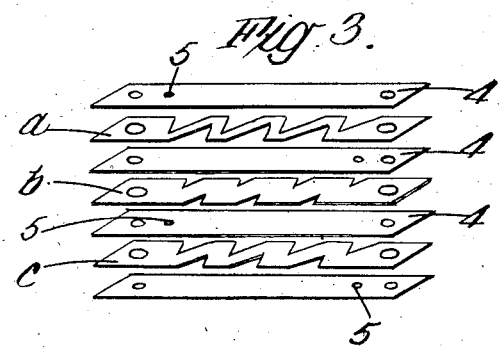
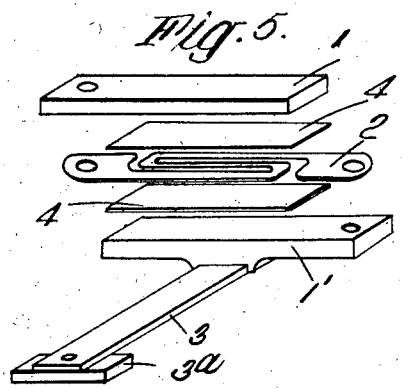

2,518,941

UNITED STATES PATENT OFFICE 2,518,941

REGULATOR FOR HEATING APPARATUS

Leonard Satchwell, William Harry Wilson, and Arthur John Chinn, Farnham Royal, England; said Wilson and said Chinn assignors to said Satchwell Application November 8, 1945, Serial No. 627,412
In Great Britain July 22, 1944

Section 1, Public Law 690, August 8, 1946
Patent expires July 22, 1964

5 Claims. (Cl. 201—69)

1

This invention relates to thermostatic regulators of the type in which variation of the proportion of "on" to "off" times of an intermittent switching cycle varies the energy input to a consuming device. It is common to provide within such regulators self-heating means independent of the heat being regulated serving to effect switching off of the regulator switch and its self heater and to effect switching on consequent upon cooling and for the relation of "on" to "off" times to be adjustable.

It is convenient for such self heating means to take the form of a resistor in series with the switch of the regulator and the load.

An object of the present invention is to provide a heat regulator of compact form for use with any electric apparatus whether for the purpose of space heating, cooking, industrial process work or the like, and more particularly to provide means whereby the resistor embodied in the regulator may be readily proportioned to extract that $I^2R$ energy necessary for its self-heating from the total load with which it is in series and to provide the possibility of good and consistent contact between the resistor and a thermal expansion member to operate its switch and further to provide ready means for proper proportioning of the physical characteristics of the combination, namely (1) self-heating, (2) thermal capacity and (3) dissipating surface within the device, these features governing the length of the operating cycle. A further object is to provide an improved construction of switch embodying such a heat regulator.

In accordance with the principal feature of the invention the regulator includes self heating means comprising a metal electrical and heat conducting block of suitable mass preferably in two parts between which is clamped a resistor element in the form of a leaf or leaves of metal cut or stamped to provide the desired ohmic value and a thermally responsive member consisting of a bimetallic strip connected in heat and electrical conducting relation to the metal block on the face opposite the leaf resistor element. The block is of relatively large mass with respect to the leaf resistor element and capable of absorbing and retaining relatively large amounts of heat.

In the accompanying drawings illustrating the invention, Figs. 1 and 2 are plan views of forms of a resistor leaf. Fig. 3 is an exploded view of a resistance heater element showing the order of

Figure 6:
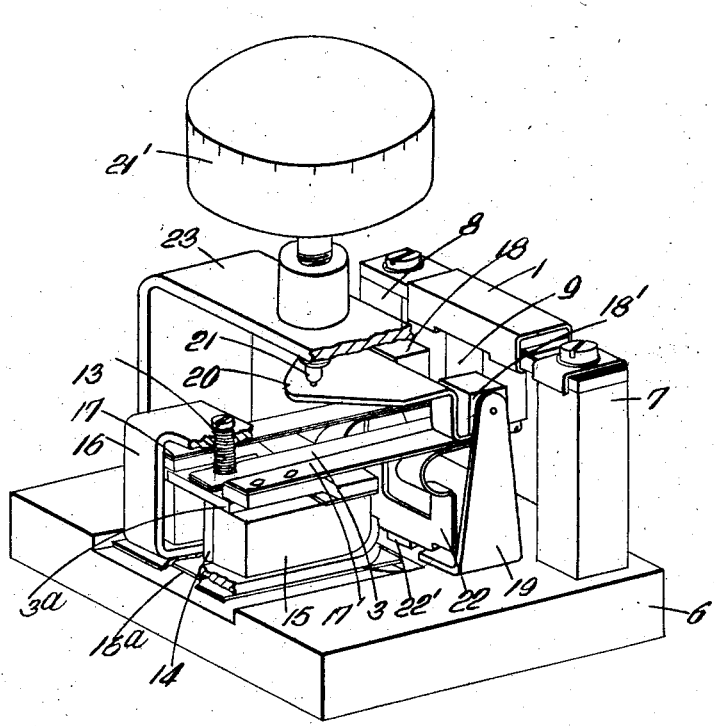
Figure 7:
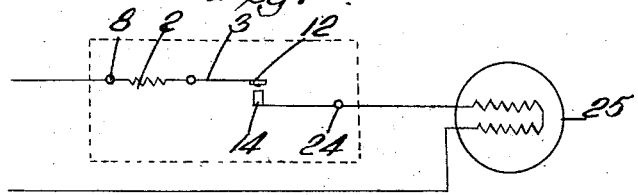

2 assembly of the parts and including three resistor leaves. Figs. 4 and 5 are exploded views of two forms of the laminated structure comprising two blocks and resistance elements each with a bimetal strip attached, Fig. 4 showing a pair of blocks with three resistor leaves of the form shown in Fig. 1 and Fig. 5 showing a pair of blocks with a single resistor leaf of the form shown in Fig. 2. Fig. 6 is a perspective view showing the application of the invention to a microgap magnetic snap action switch such as described in our British Patent No. 305,077, part of the structure being cut away to disclose the mechanism. Fig. 7 is a typical wiring diagram for the device as applied to a hot plate.

Figs. 1 and 2 illustrate two of an almost unlimited number of ways in which the metal leaf can be cut in order to vary its resistance.

Referring to Figs. 3, 4 and 5 it will be seen that the electrical resistance heater is built up of one or more resistor leaves such as shown in Figs. 1 and 2 joined at their terminal ends to the metal blocks and otherwise electrically insulated from them.

In Figs. 3 and 4 the resistance 2 comprises resistor leaves a, b and c joined at their ends to one another and to the metal blocks 4 and 4' in zig-zag relationship, say by solder and electrically insulated from each other and the metal blocks by mica or other insulating strips 4 whereby there is formed a zig-zag path for electric current. A bimetal strip 3 is intimately fixed at one end to the metal block 4', by screwing or soldering or the like. In Fig. 3 the apertures 5 in the insulating strips 4 allow solder to run from the hot tinned ends of one resistance leaf to the next and to the blocks.

In the application of the invention to a micro gap switch as shown in Fig. 6, 6 indicates a base on which are mounted two pillars 7 and 8 which serve to carry a heater element 2 such as shown in detail in Figs. 3, 4 and 5 and previously described. In close contact with the heater element 2 is clamped a metal block 9 of some good heat conducting material such as copper or brass and in good thermal contact with the lower end of the block 9 is secured a bimetallic strip 3 having attached to the free end a soft iron armature 3a (as indicated in Fig. 4) and an electrical contact 12, indicated more clearly in Fig. 4, movement of the armature 3 in one direction being restricted by an adjustable back stop 13 mounted in a frame 16 which is shown partly cut away to expose the other parts of the switch. The contact 12 co-acts with a fixed contact 14 located between the poles of a permanent magnet 15 and adjustable vertically in a base plate 16a secured to the frame 16. The magnet 15, fixed contact 14, and back stop 13 are fixed by means of a bolt (not shown) to the frame 16 which is carried by two compensating bimetallic strips 17 and 17' positioned one on each side of the bimetal strip 3, which strips are attached at their ends, remote from their attachment to frame 16, to pivot blocks 18 and 18' adapted to pivot on the arms of a U-shaped bracket 19 fixed to the base 6. Also fixed to the pivot blocks 18 and 18' is an adjusting plate 20 held in contact with the adjusting screw 21 of a regulator knob 21' by a spring 22 one end of which is fixed to the blocks 18, 18', and the opposite end of which presses against a stop 22' formed on the bracket 19. The spindle of the adjusting screw 21 is supported by an inverted U-shaped bracket 23 mounted on the base 6 and shown partly cut away in Fig. 6.

In the device shown in Fig. 6 the current is conducted to the heater 1 by pillar 8 and thence through the heater element 2 (Figs. 3, 4 and 5) to the metal block 9, thence along the bimetallic strip 3 from contacts 12 to 14, to contact plate 16A and thence by flexible lead (not shown) to terminal 24, not shown but indicated diagrammatically in Fig. 7. The passage of current through the resistance element 2 (Figs. 3, 4 and 5) causes heat to be generated at a predetermined rate and conducted to the block 9 and thence to the bimetallic strip 3. The gradually increasing temperature on the bimetal strip generates an increasing force at the armature 3a in a direction away from the magnet 15. This force eventually becomes sufficiently great to overcome the force of the magnet 15, thereby causing separation of the contacts 12 and 14 with a snap action. The time taken to operate the switch will be varied by the initial setting of the fixed contact 14 in relation to the bimetal contact 12 through the operation of adjusting screw 21. If by the turning of the adjusting screw the contacts 12 and 14 be made to press together with considerable pressure the bimetal strip 3 will have to attain a high temperature in order to generate sufficient force to separate the contacts. Under this condition the "on" time will be long and because of the fact that the temperature of the block 9 and of the bimetal strip 3 will be high at the switch "off" point, the rapid cooling will give a short "off" period. Conversely, if the contacts are made to press together with a small force, only a small temperature rise in the bimetal strip 3 is necessary to attain enough force to separate the contacts; the "on" time will then be short and, as the rate of dissipation of heat from the bimetal strip 3 and from block 9 will be slow owing to the low temperature attained at switch "off" point, the "off" period will be long. By varying the pressure between contacts 12 and 14 the time relation between the "on" position and the "off" position produced by the resistance 2 and the bimetal strip 3 can be altered.

The bimetal strip 3 is responsive to varying ambient temperatures in addition to the heating provided by the resistor element 2. In order to make the operation of the switch independent of the former influence, compensation is provided by mounting the fixed contact 14 together with magnet 15, frame 16, back stop 13 and contact plate 16a at the ends of two bimetal strips 17 and 17', the opposite ends of which are attached to the two pivot blocks 18 and 18'. The strips 17 and 17', having the same thermal deflection characteristics as the bimetal strip 3 cause the fixed contact 14 to follow the contact 12 and so maintain a constant relationship between them independent of ambient changes.

In the typical wiring diagram shown in Fig. 7, 25 is a hot plate, 12 and 14 the contacts of a switch operated by the bimetal strip 3 and 2 the heater resistance clamped within the blocks one of which is carrying the bimetal strip 3.

We claim:

1. An electrical resistance heater comprising a heat and electrical conducting block of high thermal capacity, an electrical conducting element, a leaf resistor element electrically connected at one end to said block and at its other end to said conducting element, and insulating strips lying between said block and said leaf resistor element and between said leaf resistor element and said conducting element, said insulating strips, leaf resistor element, and block being in superimposed relation, whereby heat is conducted from the resistor element and through an insulating strip to the block, said block being of relatively large mass with respect to the leaf resistor element and being capable of absorbing relatively large amounts of heat.

2. An electrical resistance heater comprising a pair of heat and electrical conducting blocks of high thermal capacity, a plurality of resistor leaves, and strips of insulation interposed between each of said leaves and between the resistor leaves and the blocks, said leaves having their ends so connected in electrical conducting relationship to adjacent leaves as to form a continuous resistor element and a zig-zag path for electric current, one terminal end of said resistor element being electrically connected to one of said rigid members, the other terminal end of said resistor element being electrically connected to the other of said blocks, said blocks, resistor leaves and insulation strips being in superimposed relation, whereby heat from the resistor leaves is conducted through said insulation to said blocks, said blocks being of relatively large mass with respect to the resistor leaves and being capable of absorbing relatively large amounts of heat.

3. An electrical resistance heater as defined in claim 1 in which said resistor element comprises a plurality of resistor leaves having their ends alternately connected in electrical conducting relationship to form a continuous zig-zag path for electric current and having strips of insulation interposed between adjacent leaves.

4. In a heat regulator including a bimetallic thermal-responsive switch element, an electrical heater for said switch element comprising a heat and electrical conducting block of high thermal capacity, an electrical conducting element, a leaf resistor element disposed between said block and said conducting element, said resistor element having one end connected to one face of said block and its other end connected to said conducting element, said block being of relatively large mass with respect to said resistor element and capable of adsorbing and retaining relatively large amounts of heat, and insulating strips interposed between the block and the resistor element and between the resistor element and the conducting element.

5. In a heat regulator including a bimetallic thermal-responsive switch element, an electrical resistance heater for said switch element comprising a pair of heat and electrical conducting blocks of high thermal capacity, a plurality of resistor leaves disposed between said blocks, said blocks being of relatively large mass with respect to said resistor leaves and capable of absorbing and retaining relatively large amounts of heat, and insulating strips interposed between adjacent resistor leaves and between the blocks and the resistor leaves adjacent thereto, said resistor leaves being alternately connected at their ends in electrical conducting relationship to form a resistor element of continuous zig-zag path for electrical current between the terminal ends thereof, one terminal end being electrically connected to one of said blocks and the other terminal end being electrically connected to the other of said blocks.

LEONARD SATCHWELL.
WILLIAM HARRY WILSON.
ARTHUR JOHN CHINN.

REFERENCES CITED

The following references are of record in the file of this patent:

UNITED STATES PATENTS

| Number | Name | Date |
|---|---|---|
| 791,691 | Hadaway | June 6, 1905 |
| 1,292,773 | Hertzberg | Jan. 28, 1919 |
| 1,501,017 | Hall | July 8, 1924 |
| 1,783,904 | Carter | Dec. 2, 1930 |
| 2,238,219 | Finerman | Apr. 15, 1941 |
| 2,285,677 | Myers | June 9, 1942 |
| 2,347,014 | Willmann | Apr. 18, 1944 |
| 2,352,439 | Landon | June 27, 1944 |
| 2,360,265 | Osterheld | Oct. 10, 1944 |

FOREIGN PATENTS

| Number | Country | Date |
|---|---|---|
| 305,077 | Great Britain | Jan. 27, 1929 |